United States Patent
Catling et al.

(10) Patent No.: US 11,899,910 B2
(45) Date of Patent: Feb. 13, 2024

(54) MULTI-LOCATION COPYING AND CONTEXT BASED PASTING

(71) Applicant: International Business Machines Corporation, Armonk, NY (US)

(72) Inventors: Samantha Catling, Winchester (GB); Emma Jane Dawson, Eastleigh (GB); Ashleigh Shona Denholm, Southampton (GB); Jack Peter Wadsted, Southampton (GB)

(73) Assignee: International Business Machines Corporation, Armonk, NY (US)

(*) Notice: Subject to any disclaimer, the term of this patent is extended or adjusted under 35 U.S.C. 154(b) by 43 days.

(21) Appl. No.: 17/654,877

(22) Filed: Mar. 15, 2022

(65) Prior Publication Data
US 2023/0297217 A1 Sep. 21, 2023

(51) Int. Cl.
G06F 40/00 (2020.01)
*G06F 3/0484* (2022.01)
*G06F 40/18* (2020.01)
*G06F 40/20* (2020.01)

(52) U.S. Cl.
CPC ............ *G06F 3/0484* (2013.01); *G06F 40/18* (2020.01); *G06F 40/20* (2020.01)

(58) Field of Classification Search
CPC ......... G06F 3/0484; G06F 40/18; G06F 40/20
See application file for complete search history.

(56) References Cited

U.S. PATENT DOCUMENTS

| | | | | |
|---|---|---|---|---|
| 10,489,032 B1* | 11/2019 | Margolin | ............ | G06F 21/6245 |
| 10,928,992 B2* | 2/2021 | Lee | ........................ | G06F 40/279 |
| 11,113,460 B2 | 9/2021 | Tang | | |
| 11,132,115 B1* | 9/2021 | Brown | .................. | G06F 40/166 |

(Continued)

FOREIGN PATENT DOCUMENTS

EP 31967981 A 7/2017

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Barbara M Level
(74) *Attorney, Agent, or Firm* — Peter Suchecki

(57) ABSTRACT

Provided is a computer-implemented method, system, and computer program product for multi-location copying and context-based pasting. A processor may collect a plurality of copied data elements into a clipboard manager. The processor may compare, in response to a paste function being initialized into an input field of a plurality of input fields, the copied data elements and associated metadata with contextual data associated with the plurality of input fields. The processor may calculate, based on the comparing, a data environment confidence value and an individual confidence value for each copied data element with respect to a level of matching the contextual data associated with the input fields. The processor may generate, based on the calculating, an overall confidence value for the copied data elements. The processor may compare the overall confidence value of the copied data elements to a set of confidence thresholds associated with completing the paste function.

15 Claims, 9 Drawing Sheets

(56) References Cited

U.S. PATENT DOCUMENTS

| | | | |
|---|---|---|---|
| 2008/0201656 A1* | 8/2008 | Kim | G06F 40/166 |
| | | | 715/749 |
| 2011/0125970 A1* | 5/2011 | Commarford | G06F 9/543 |
| | | | 711/E12.017 |
| 2011/0126092 A1* | 5/2011 | Harris | G06F 40/174 |
| | | | 715/256 |
| 2012/0041985 A1* | 2/2012 | Engel | G06F 3/04842 |
| | | | 707/E17.143 |
| 2012/0324476 A1* | 12/2012 | Reissman | G06F 9/543 |
| | | | 719/312 |
| 2013/0054731 A1* | 2/2013 | Branton | G06F 40/166 |
| | | | 709/213 |
| 2017/0063962 A1* | 3/2017 | Padmanabhan | G06F 3/0486 |
| 2018/0341371 A1 | 11/2018 | Callaghan | |
| 2019/0129940 A1 | 5/2019 | Hewitt et al. | |
| 2019/0213249 A1* | 7/2019 | Kistler | G06F 40/166 |
| 2019/0324826 A1* | 10/2019 | Abuelata | G06F 3/048 |
| 2019/0325016 A1* | 10/2019 | Nicholson | G06F 9/543 |
| 2019/0347320 A1 | 11/2019 | Callaghan | |
| 2020/0167068 A1* | 5/2020 | Tao | G06F 21/629 |
| 2020/0265040 A1 | 8/2020 | Jung et al. | |
| 2021/0064448 A1* | 3/2021 | Kochura | G06F 3/04842 |
| 2022/0206995 A1* | 6/2022 | Zadina | G06F 16/168 |
| 2023/0101774 A1* | 3/2023 | West | G06F 3/04842 |
| | | | 715/770 |
| 2023/0229850 A1* | 7/2023 | Raza | G06F 40/154 |
| | | | 715/209 |

* cited by examiner

300

| Data Environment | Ideal | Accepted | Not Ideal |
|---|---|---|---|
| IDE | Code | Short Text<br>Long Text<br>Address | Document |
| Spreadsheet | Short text<br>Address<br>Integer | Long Text | Code<br>Image<br>Document |
| Text document | Short text<br>Address<br>Integer<br>Long text | Images | Code |

FIG. 3

MULTI-LOCATION COPYING AND CONTEXT BASED PASTING

BACKGROUND

The present disclosure relates generally to the field of computer processing and, more specifically, to multi-location copying and context based pasting of data types in variable data environments.

Copying and pasting data is a common task that is performed on a daily basis by most users that operate within a computing environment. When copying and pasting, a single instance of copied data is stored on a clipboard and pasted when a paste function is initiated. For example, a user may copy a first data item from one document and paste the copied first data item in another document. When a second data item is copied to the clipboard, it replaces the first data item. This process continues as the user copies and pastes each given data item.

SUMMARY

Embodiments of the present disclosure include a computer-implemented method, system, and computer program product for multi-location copying and context-based pasting. A processor may collect a plurality of copied data elements into a clipboard manager, wherein metadata associated with the plurality of copied data elements is also saved to the clipboard manager. The processor may compare, in response to a paste function being initialized into one or more input fields of a plurality of input fields, the plurality of copied data elements and associated metadata with contextual data associated with the plurality of input fields. The processor may calculate, based on the comparing, a data environment confidence value and an individual confidence value for each copied data element of the plurality of copied data elements with respect to a level of matching the contextual data associated with the plurality of input fields. The processor may generate, based on the calculating, an overall confidence value for the plurality of copied data elements. The processor may compare the overall confidence value of the plurality of copied data elements to a set of confidence thresholds associated with completing the paste function.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example table for identifying data environment matches, in accordance with some embodiments of the present disclosure.

Figure 1:
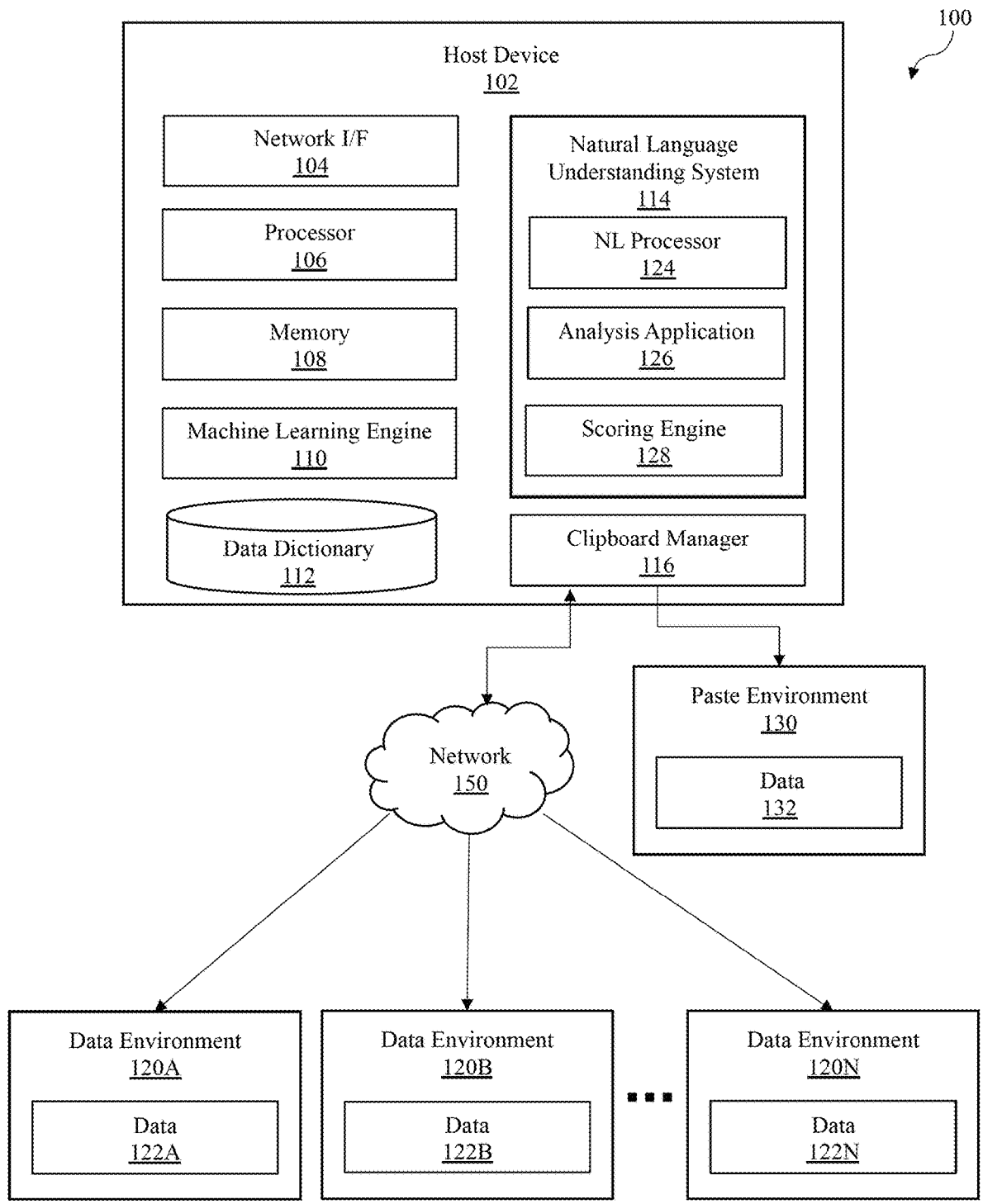
FIG. 1 illustrates a block diagram of an example multi-location copying and pasting system, in accordance with some embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of computer processing and, more particularly, to multi-location copying and context based pasting of data types in variable data environments. While the present disclosure is not necessarily limited to such applications, various aspects of the disclosure may be appreciated through a discussion of various examples using this context.

Copying and pasting data is a common task that is performed on a daily basis by most users that operate within a computing environment. When copying and pasting, a single instance of copied data is stored on a clipboard and pasted when a paste function is initiated. For example, a user may copy a first data item from one document and paste the copied first data item in another document. When a second data item is copied to the clipboard, it replaces the first data item. This process continues as the user copies and pastes each given data item. In most instances, if the user wants to copy multiple data items from multiple locations within the document, or from other data sources/environments simultaneously, the user may have to individually copy and paste each data item one at a time to complete this task. Performing this copying and pasting task in this way may be cumbersome and inefficient.

Embodiments of the present disclosure include a system, computer-implemented method, and computer program product that allow the user to copy multiple data elements or items from various data environments to a clipboard and intuitively determine which copied data elements/items should be pasted in the correct input field of a document and/or data environment based on contextual analysis.

In embodiments, a user may initiate a copy function to copy data (e.g., data elements, textual data, code, image data, data objects, data items, etc.) from one or more data environments. The data environment may be any type of data environment that data can be copied (or cut) from (e.g., an integrated development environment (IDE), website, programming environment, electronic document/spreadsheet, etc.). In response to the copy function being initiated, a clipboard manager will collect any copied data to the clipboard without overwriting any of the previously copied data. For example, a user may continuously copy data (e.g., data elements such as text, code, image data, etc.) from one or more data environments and the data will be appended to the clipboard. For example, a user may copy data from a document, a website, and a software application, and each instance of copied data will be appended to the clipboard manager without overwriting the previously copied data. Additionally, metadata associated with the copied data may be collected and/or generated as descriptive metadata as each copied data is added to the clipboard.

In embodiments, as each copied data and associated metadata is appended to the clipboard manager, it is analyzed by the system to identify the context and/or attributes of the copied data. For example, the system may analyze each copied data and classify the data type as a data object, string, array, integer, image, document, etc. In embodiments, the system may determine the origin of the copied data and any additional context related to the data. For example, the system may identify what application (data environment) the data was copied from and if there is additional context related to the data (e.g., identify headings or labels next to the copied data within the data environment, division tags, programming language, etc.).

In embodiments, the system may analyze each copied data to identify one or more contextual subtypes of the copied data. For example, the system may identify whether the copied data comprises short text, long text, code, address information, phone numbers, email, sort code, account numbers, card numbers etc. In embodiments, the system may utilize natural language understanding (NLU) to analyze the context of the copied data.

In embodiments, the system will continue to collect and analyze each copied data that is appended to the clipboard manager until a paste function is initiated by the user in a paste environment. In response to detecting the paste function in the paste environment, the system will automatically compare the copied data and associated metadata that is on the clipboard manager with the metadata and contextual data associated with the paste environment.

For example, the system may compare metadata associated with the copied data to the metadata associated with the paste environment to see if the data environment where the copied data was copied from matches the paste environment. For example, the system may identify that the copied data was copied from a text document and pasted in a spreadsheet. If the copied data environment and paste environment are the same and/or compatible, the system may determine that the copied data can be pasted in the paste environment in the original copied form. If the copied data environment and paste environment are different and/or not compatible, the copied data may be pasted as plain text. The system may generate a data environment confidence value based on whether the paste environment and the data environment where the copied data originated match.

In embodiments, the system may analyze input fields of the paste environment to determine the context of where the user wants to paste the plurality of copied data. For example, the paste environment may contain a plurality of input fields that contain various textual headings, labels, and/or division tags. The system may evaluate the headings/labels/division tags and compare them with each copied data on the clipboard manager. Further, the system may analyze any other various contextual data that can be used to determine where to paste the copied data within the input fields of the paste environment. The system may calculate an individual confidence value for each copied data with respect to a level of matching the contextual data associated with the plurality of input fields.

In embodiments, the system may generate an overall confidence value for the plurality of copied data using the calculated data environment confidence values and each individual confidence value for each of the copied data. The overall confidence score is used to determine how the copied data will be pasted into the input fields of the paste environment. In some embodiments, the overall confidence value may be generated by averaging the individual confidence values and data environment confidence value for the copied data. The overall confidence score may be compared to a set of confidence thresholds associated with completing the paste function (e.g., paste automatically, paste some data as plain text, terminate paste function). The set of confidence thresholds may be automatically generated using machine learning or manually set by the user.

In some embodiments, there may be a first confidence threshold (high threshold) and a second confidence threshold (low threshold). If the overall confidence score meets the first confidence threshold, the system will automatically paste each copied data of the plurality of copied data into a closest matching input field (based on the individual confidence value) in the original copied form. Because the overall confidence value is high, this indicates that the copied data has been determined to match or closely match the appropriate input fields within the paste environment, and the given copy and paste environments match (cutting and pasting compatible data). In this way, the system allows the user to just cut and paste naturally while having their multiple instances of copied data to be pasted in the correct input field in the paste environment.

In some embodiments, if the overall confidence score does not meet the first confidence threshold but falls within a range between the first and second confidence threshold, then the system will automatically notify the user that the copied data only met the range. In some embodiments, the system will then evaluate each copied data individually and determine which copied data failed to meet an individual confidence threshold. Once identified, the system will request that the user select how to paste the copied data that failed to meet the individual confidence threshold. For example, the selection may include pasting the copied data that failed to meet the threshold as plain text and all other copied data in the original copied form. Alternatively, the selection may include pasting all copied data as plain text or to terminate the completion of the paste function on an individual or overall basis for each of the copied data that is stored on the clipboard manager. In embodiments, the copied data that failed to meet the threshold may be pasted as plain text within the selected input field(s) where the paste function was initiated. In some embodiments, the system may request that the user chose where to paste the copied data that failed the individual thresholds within the paste environment. This allows the user to assess the failed matches and correctly paste the copied data in the appropriate input field or area within the paste environment.

In some embodiments, if the overall confidence value does not meet the second threshold, then the user will be notified that the overall confidence value did not meet the adequate pasting range. The system will request that the user select how to handle the copied data on the clipboard manager. In some embodiments, the selection may include pasting all the copied data as plain text in the input field that was selected by the user (e.g., reverting to standard cut and paste functionality) or terminating the completion of the paste function.

In some embodiments, after the system pastes the copied data from the clipboard manager into the input fields of the paste environment, the system may reset the clipboard manager once a copy function (or cut) is detected/initiated in one or more data environments. In some embodiments, the system may maintain all copied data on the clipboard manager even after the copied data has been pasted and continue to append the clipboard manager with new copied data. In this way, the system may use all copied data and associated metadata to make contextual determinations on where to paste the copied data in the paste environment.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of an example multi-location copying and pasting system 100 in which illustrative embodiments of the present disclosure may be implemented. In the illustrated embodiment, the multi-location copying and pasting system 100 includes host device 102 that is communicatively coupled to data environment 120A, data environment 120B, data environment 120N (collectively referred to as data environments 120), and paste environment 130 via network 150. In embodiments, host device 102, data environments 120, and paste environment 130 may be configured as any type of computer system and may be substantially similar to computer system 601 of FIG. 6. For example, data environments 120 and paste environment 130 may be configured as various websites, integrated development environments, media environments, etc., that are hosted on communicatively coupled computer systems where data 122 may be copied and pasted into paste environment 130. In some embodiments, the data environments 120 and paste environment 130 may be local to the host device 102 itself. For example, the host device 102 may collect copied data 122 from multiple data environments 120 (e.g., documents, spreadsheets, coding software) that are opened locally and paste the copied data into paste environment 130 (e.g., spreadsheet, text document).

In embodiments, network 150 may be any type of communication network, such as a wireless network, edge computing network, a cloud computing network, or any combination thereof (e.g., hybrid cloud network/environment). Network 150 may be substantially similar to, or the same as, cloud computing environment 50 described in FIG. 7. Consistent with various embodiments, a cloud computing environment may include a network-based, distributed data processing system that provides one or more edge/network/cloud computing services. Further, a cloud computing environment may include many computers (e.g., hundreds or thousands of computers or more) disposed within one or more data centers and configured to share resources (e.g., data 122) over network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, host device 102 may communicate with data environments 120 and paste environment 130 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments host device 102 may communicate with paste environment 130 locally, while communication between data environments 120 may be through a wireless communication network.

In embodiments, host device 102 includes processor 106 and memory 108. The host device 102 may be configured to communicate with data environments 120 and paste environment 130 through an internal or external network interface 104. The network interface 104 may be, e.g., a modem or a network interface card. The host device 102 may be equipped with a display or monitor. Additionally, the host device 102 may include optional input devices (e.g., a keyboard, mouse, scanner, or other input device), and/or any commercially available or custom software (e.g., browser software, communications software, server software, natural language processing/understanding software, search engine and/or web crawling software, filter modules for filtering content based upon predefined parameters, etc.).

In some embodiments, the host device 102 may include machine learning engine 110, data dictionary 112, natural language understanding (NLU) system 114, and clipboard manager 116. The NLU system 114 may include a natural language processor 124, an analysis application 126, and a scoring engine 128. The natural language processor 124 may include numerous subcomponents, such as a tokenizer, a part-of-speech (POS) tagger, a semantic relationship identifier, and a syntactic relationship identifier. An example natural language processor is discussed in more detail in reference to FIG. 5.

Clipboard manager 116 is configured to collect a plurality of data 122 from data environments 120 in response to a user initiating a copy function and/or cut function. For example, a user editing a document may copy data 122A, data 122B, and data 122N from data environment 120A, data environment 120B, and data environment 120N, respectively, without overwriting each data instance on the clipboard manager 116. In embodiments, the data 122 may comprise any type of copied data, such as unstructured data, code, metadata, contextual data, etc.

As each data 122 is copied to the clipboard manager 116, the analysis application 126 is configured to analyze the data 122 and generate descriptive metadata. For example, the analysis application 126 is configured to determine what type of data (e.g., code, a string, an image, an address, etc.) is copied each time. Further, the analysis application 126 will determine the origin of the data. For example, the analysis application 126 will determine what type of data environment 120 (e.g., IDE, text document, spreadsheet, web browser, coding program, etc.) the data came from and the context where the data was copied from. For example, the analysis application 126 may parse the respective data environment 120 to identify if there is contextual data (e.g., headings, programming language, division tags, labels, etc.) associated with the copied data that may be used to determine relationships to data 132 of the paste environment 130. The analysis application 116 may log the context of the data using the clipboard manager 116.

Clipboard manager 116 will continue to append the clipboard with data 122 (including generated metadata) until the user is finishing copying data thereto. The clipboard manager 116 is configured to detect a paste function is initiated in one or more input fields in the paste environment 130. In response to the paste function being detected, the analysis application 126 may crawl the data 132 of the paste environment 130 to determine the context of the paste environment. The analysis application 126 may utilize data dictionary 112 to perform an evaluation/comparison of each data environment 120 associated with each respective copied data 122 with the paste environment 130 to identify if they match. For example, copied data from a textual document may be classified as an accepted match for pasting in a spreadsheet. An example of the data dictionary is further detailed in FIG. 3. In some embodiments, scoring engine 128 may calculate data environment confidence values based on how close of a match each respective data environment 120 is to the paste environment 130.

In embodiments, the analysis application 126 is configured to search the data 132 of the paste environment 130 to identify contextual data (e.g., unstructured data or textual content) that is used to determine where the multiple instances of copied data 122 on the clipboard manager should be pasted within the paste environment 130. The analysis application 126 performs a comparison of the copied data 122 and/or associated metadata from the data environments 120 and the data 132 of the paste environment 130. The scoring engine 128 will calculate individual confidence values for each individual copied data item stored on the clipboard manager 116 with respect to the data 132 of the paste environment 130. Using the individual confidence values and the data environment confidence values, the system 100 can generate an overall confidence value that is compared to a set of overall confidence thresholds used to determine how the copied data should be pasted (e.g., original form, plain text, terminate paste function if no match, etc.). If the overall threshold holds are met, the copied data may be pasted to respective matching input fields based on the individual confidence values.

For example, the copied data 122 may include multiple street addresses, email addresses, and profile pictures taken from various data environments 120, and the paste environment 130 may be a spreadsheet with input field headings for "street address", "email address", and "profile ID." The NLU system 114 may analyze the textual content and determine which copied data matches the input fields in the paste environment by utilizing the individual confidence values. For example, the NLU system 114 may identify the street addresses as an exact match to the heading "street address" and generate high confidence values, while providing the street addresses with low confidence scores when compared to the headings "email address" and "profile ID." Using the confidence values, the system 100 automatically will populate the matching input fields in the paste environment 130 with the correct copied data 122.

In embodiments, the host device 102 may use a machine learning engine 110 to improve its capabilities automatically through experience and/or repetition without procedural programming. For example, machine learning engine 110 may analyze the accuracy of the confidence values and/or confidence thresholds generated by the host device 102 and provided to the user. The machine learning engine 110 may determine if the confidence values and/or confidence thresholds were accurate by monitoring feedback from the user with respect on manual changes to the paste function. The machine learning engine 110 may determine that the confidence values were incorrect, or the confidence thresholds were too low/high based on analyzing user manipulation of the pasted data after the paste function was completed. If the user has to continually adjust where (some of) the copied data 122 is pasted in the paste environment 130, then the machine learning engine 110 may increase confidence thresholds and/or adjust the specificity of confidence value determinations. The machine learning engine 110 may modify algorithms for comparing and/or matching copied data 122 with contextual data/data 132 from the paste environment 130 in order to provide more accurate pasting. In this way, the system may become more accurate in pasting multiple instances of copied data in the paste environment initially without the user having to adjust the pasting manually.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

It is noted that FIG. 1 is intended to depict the representative major components of an exemplary multi-location copying and pasting system 100. In some embodiments, however, individual components may have greater or lesser complexity than as represented in FIG. 1, components other than or in addition to those shown in FIG. 1 may be present, and the number, type, and configuration of such components may vary.

For example, while FIG. 1 illustrates a multi-location copying and pasting system 100 with a single host device 102, three data environments 120, a single paste environment 120, and a single network 150, suitable computing environments for implementing embodiments of this disclosure may include any number of copying and pasting systems, host devices, data environments, paste environments, and networks. The various modules, systems, and components illustrated in FIG. 1 may exist, if at all, across a plurality of multi-location copying and pasting systems, host devices, data environments, paste environments, and networks.

Figure 2:
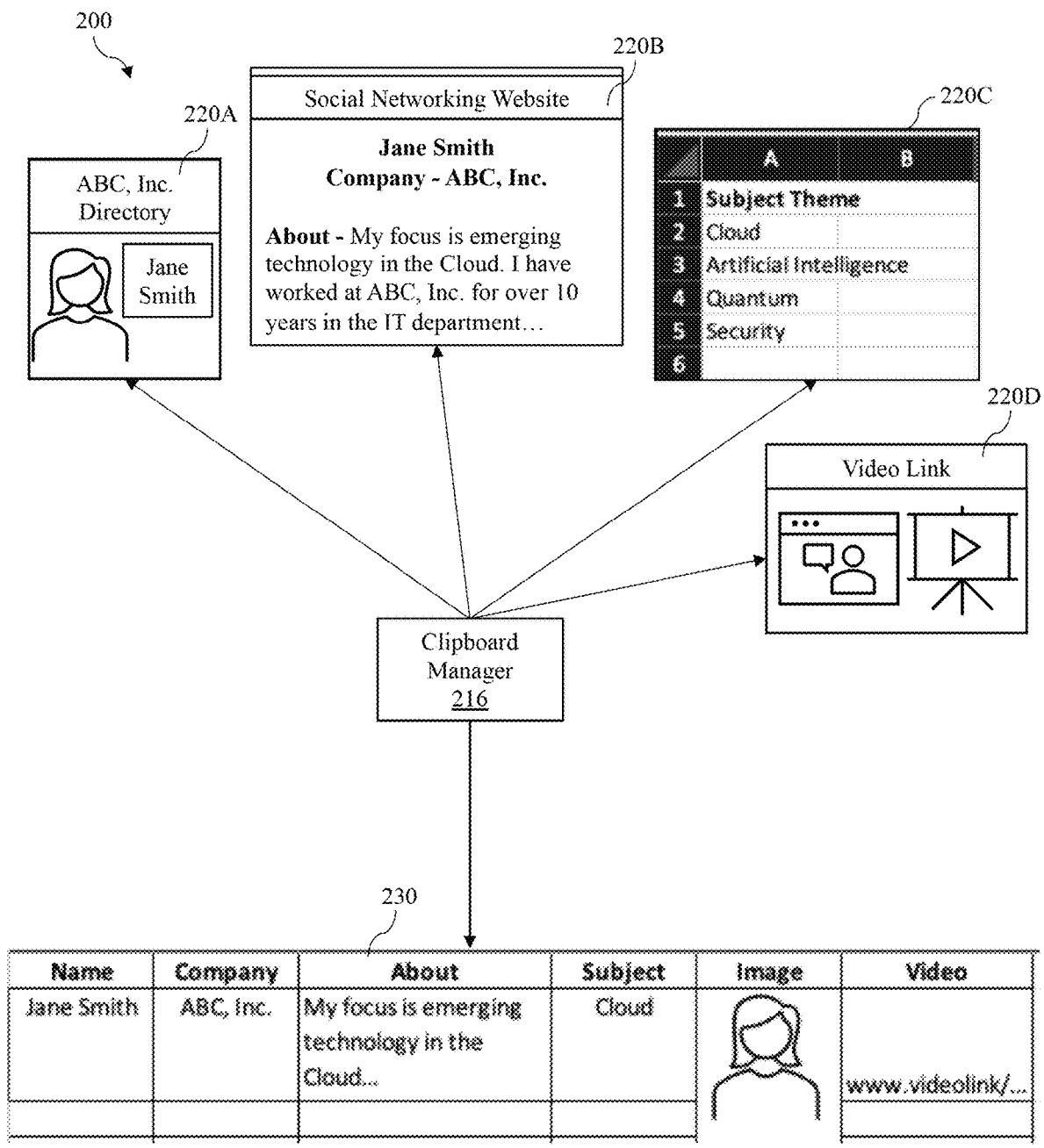
FIG. 2 illustrates an example diagram for multi-location copying and pasting from a plurality of data environments, in accordance with some embodiments of the present disclosure.

Referring now to FIG. 2, shown is an example diagram for multi-location copying and pasting from a plurality of data environments 200, in accordance with some embodiments of the present disclosure.

In the illustrated embodiment, clipboard manager 216 collects copied data from data environment 220A (company directory), data environment 220B (social networking website), data environment 220C (spreadsheet), and data environment 220D (video link from a website) in response to a copy or cut function being initiated by a user. For example, the user may copy profile image data from a company directory, biography/about textual content from a social networking website, contextual data from a spreadsheet, and video content from a streaming website to the clipboard manager 216. As each data instance is copied, the respective data is appended to the clipboard without losing any of the previously copied data. Further, descriptive metadata is generated for each instance of copied data and stored by the clipboard manager 216.

When the user is finished copying the given data, the clipboard manager 216 is configured to detect initiation of a paste function within a paste environment 230. The paste environment 230 may include multiple input fields for where the copied data is to be pasted. In the illustrated embodiment, the paste environment 230 includes input fields having headings for "Name", "Company", "About", "Subject", "Image", and "Video". In response to detecting the paste function, the system 100 automatically analyzes the paste environment 230 (e.g., analyzes data, contextual data, metadata, code, etc.) and compares the paste environment to the copied data on the clipboard manager 216. The system 100 determines if the copied data matches the paste environment and pastes the copied data in the appropriate input fields based on a calculated confidence value.

For example, using the calculated confidence values, the copied profile image data is automatically pasted under the "Image" heading, the copied biography/about textual data from the social networking website is automatically pasted under the "About" heading, and the name "Jane Smith" copied from both the directory and social networking website is automatically pasted under the "Name" heading. In some embodiments, if multiple iterations of the same copied data appear on the clipboard manager, a single instance (e.g., Jane Smith) of the copied data may be pasted in the input field.

In some embodiments, if the data is copied from a data environment (e.g., integrated development environment) that does not match (not compatible or does not paste well) the paste environment (e.g., spreadsheet or text document), the system 100 may paste the copied data in a different format (e.g., plain text). For example, the copied video content from data environment 220D is pasted as a plain text video link rather than an embedded video. In some embodiments, the system may request that the user select how to paste copied data that does not match (e.g., failing to meet one or more confidence thresholds) the context of the input fields of the paste environment. In this way, the system may automatically paste copied data in input fields where the data has been determined to be a match and allow further user input to determine pasting of non-matching data.

Referring now to FIG. 3, shown an example table 300 for identifying data environment matches, in accordance with some embodiments of the present disclosure. In the illustrated embodiment, table 300 includes columns for the type of data environment, the ideal data for pasting in the data environment, accepted data for pasting in the data environment, and data that is not ideal when pasting into the given data environment. For example, in an integrated development environment (IDE), the ideal data to cut and paste would be code based data. However, data such as short text, long text, and addresses would be accepted as pasted data. Data such as a document that is cut and pasted into the IDE would not be an ideal match and would be given a low confidence score. In another example, the ideal pasted data for a spreadsheet data environment comprises unstructured data such as short texts, addresses, and integers. While long text is accepted pasted data, code, images, and documents are not ideal for pasting. In some embodiments, the system 100 may utilize table 300 to calculate data environment confidence values used for determining how copied data is pasted into a given paste environment. In some embodiments, table 300 may be stored in data dictionary 112.

Figure 4A:
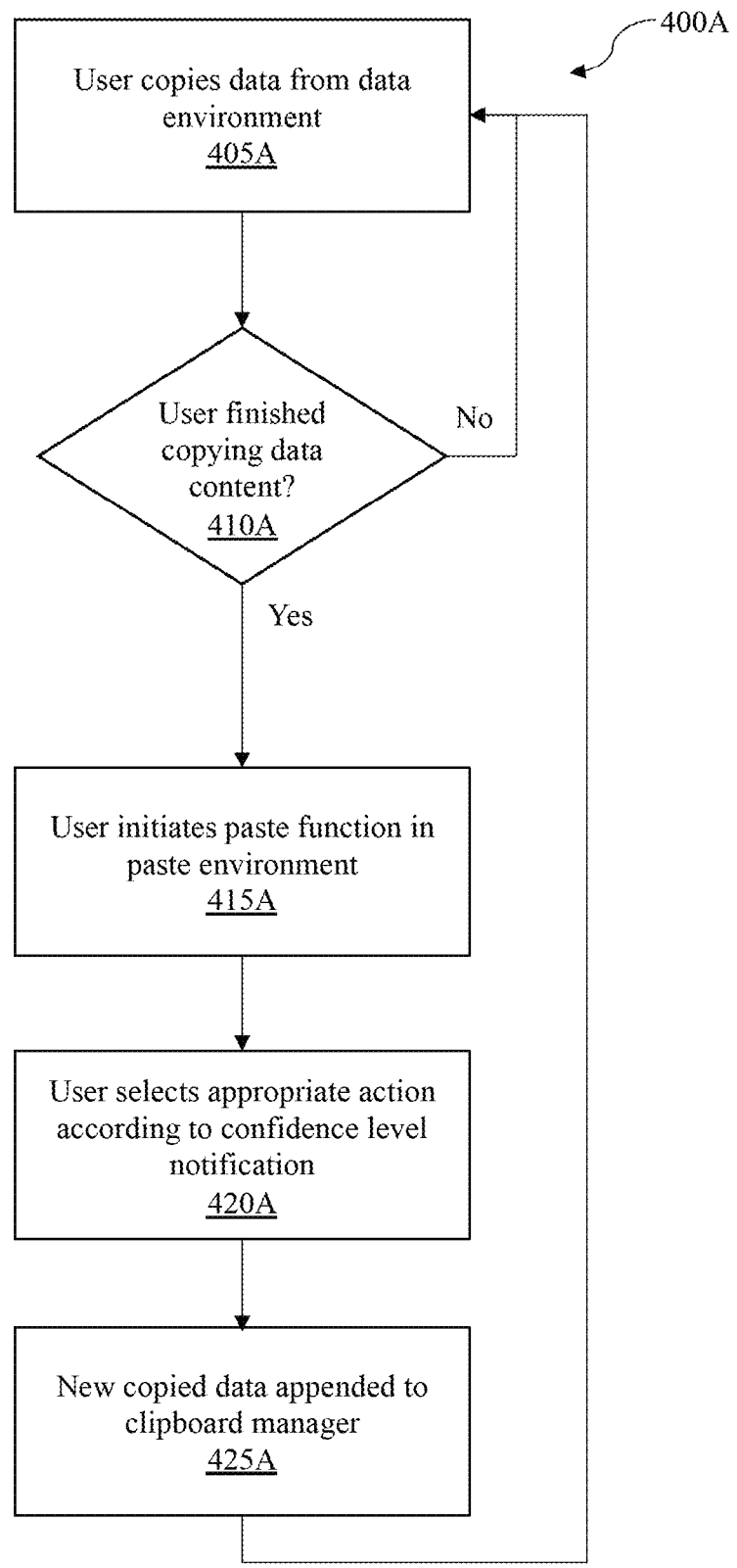
FIG. 4A illustrates a flow diagram of an example process for multi-location copying and pasting by a user, in accordance with embodiments of the present disclosure.
Figure 4B:
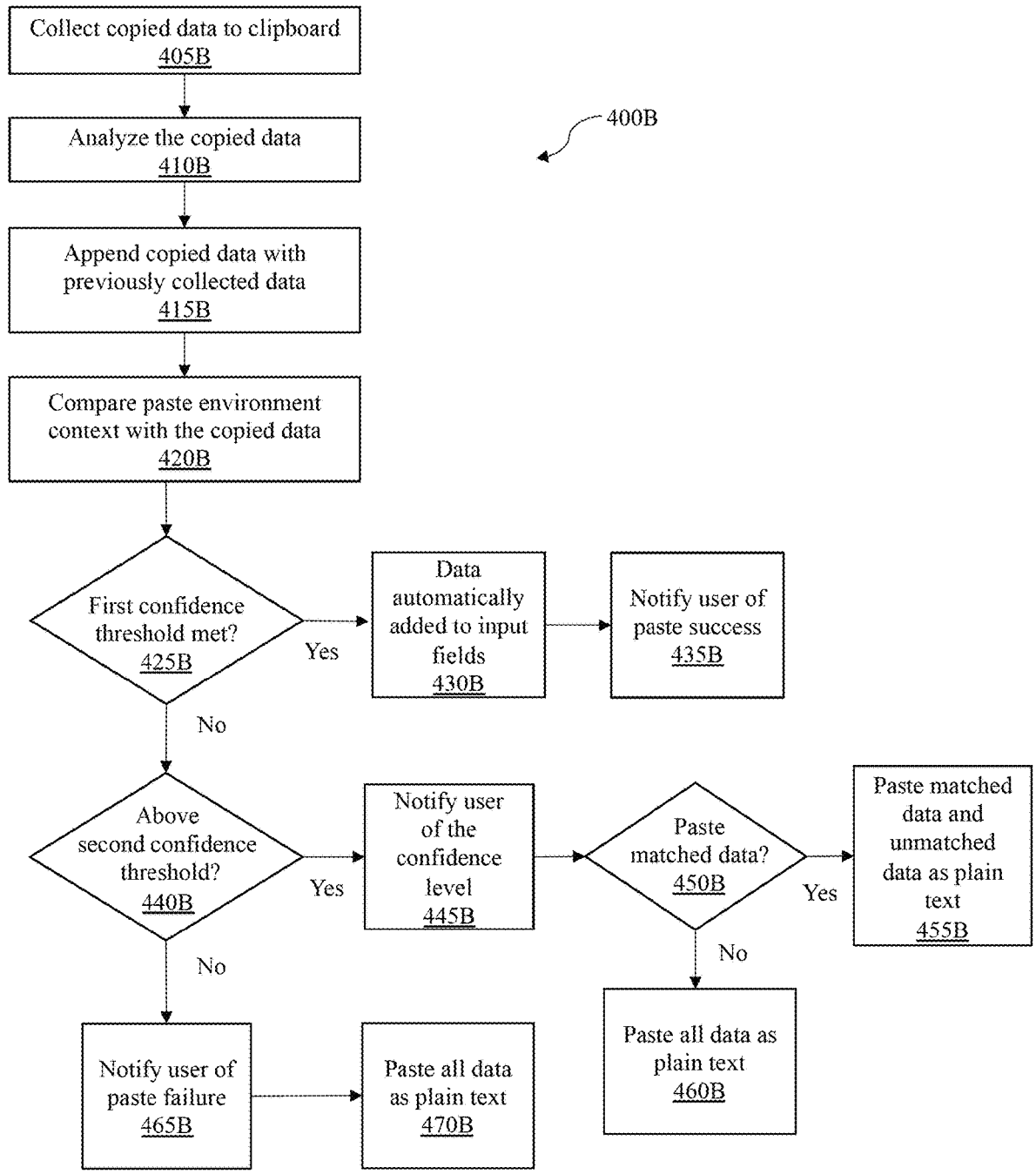
FIG. 4B illustrates a flow diagram of an example process for multi-location copying and pasting that corresponds to the user steps of FIG. 4A, in accordance with some embodiments of the present disclosure.

Referring now to FIGS. 4A and 4B, shown is a flow diagram of an example process 400A for multi-location copying and pasting by a user and a flow diagram of an example process 400B for multi-location copying and pasting that corresponds to the user steps of FIG. 4A, respectively, in accordance with embodiments of the present disclosure. It is noted that FIG. 4A and FIG. 4B may have overlapping steps which will be noted accordingly.

The processes 400A and 400B may be performed by processing logic that comprises hardware (e.g., circuitry, dedicated logic, programmable logic, microcode, etc.), software (e.g., instructions run on a processor), firmware, or a combination thereof. In some embodiments, the processes 400A and 400B are computer-implemented processes. In embodiments, the processes 400A and 400B may be performed by processor 106 of host device 102 exemplified in FIG. 1.

The process 400A begins by a user copying data from a data environment to a clipboard manager. This is illustrated at step 405. For example, the user may initiate a copy function in order to copy textual data from a text document to the clipboard manager.

In response to the user initiating a copy function, process 400B begins by collecting copied data to the clipboard manager. This is illustrated at step 405B. As the data is collected to the clipboard manager, process 400B continues by analyzing each copied data. This is illustrated at step 410B. In embodiments, the copied data may be analyzed using natural language understanding. In embodiments, the copied data may be analyzed to determine the type of data that was copied, the origin of the data, and/or the context from where the data was copied from. In embodiments, the system may generate descriptive metadata related to the copied data and store the metadata on the clipboard. For example, the system may generate metadata about the data environment the copied data originated from along with the type of data, field name, form, or headings. For example, the system may identify if there are html tags associated with the data or if the data comprises code.

The process 400A continues by determining if the user is finishing copying data from one or more data environments. This is illustrated at step 410A. If "No" the process returns to step 405A. The user may continue to copy data from the same or a different data environment. If the user continues to copy data from various data environments, the process 400B returns steps 405B-410B where the clipboard manager continues to collect any new instances of copied data and analyzes the new instances of copied data. As the user continues to copy data, process 400B continues by appending the copied data with the previously collected data stored on the clipboard manager without overwriting the previously copied data. This is illustrated at step 415B.

Returning to process 400A, if the user is finished copying data, "Yes" at step 410A, then the process 400A continues by the user initiating a paste function into a data environment. This is illustrated at step 415A. The user may initiate the paste function into one or more input fields within a paste environment.

Returning to process 400B, as the paste function is initiated by the user at step 415A, process 400B continues to compare the paste environment context with the copied data stored on the clipboard manager. This is illustrated at step 420B. In embodiments, the system may search/crawl the context of the paste environment to determine if the input fields and/or associated contextual data (e.g., metadata, textual data, headings, etc.) match any of the copied data stored on the clipboard manager. In embodiments, the system may calculate, based on the comparison, an individual confidence value for each copied data on the clipboard manager with respect to matching the contextual data associated with the input fields. In some embodiments, a data environment confidence value may be generated based on the comparison of the data environment which each given data was copied from and the paste environment where the data is to be pasted. For example, the data environment confidence value may be generated using the table from FIG. 3. In some embodiments, an overall confidence score may be generated using an average of the individual confidence values and the data environment confidence value generated from the comparison of the data environments. This overall confidence value may be compared to a set of overall confidence thresholds used to determine how the copied data on the clipboard should be pasted upon initiation of the paste function, as detailed below. The overall confidence thresholds may be generated manually by user and/or by machine learning.

The process 400B continues by comparing the overall confidence value for the copied data on the clipboard manger to a first confidence threshold. This is illustrated at step 425B. For example, the first confidence threshold may be set to a high value such as 0.8. If the overall confidence value meets or exceeds the first confidence threshold, "Yes" at 425B, the process 400B continues to automatically paste the copied data into the respective input fields in the paste environment. This is illustrated at step 430B. In embodiments, the copied data is automatically pasted in the input fields that match the respective data based on the individual confidence value. The process 400B continues by notifying the user of the paste success once the copied data is pasted in the respective input fields in the paste environment. This is illustrated at step 435B.

If the overall confidence value fails to meet the first confidence threshold, "No" at step 425B, the process 400B continues to compare the overall confidence value to a range between the first confidence threshold and a second confidence threshold. This is illustrated at step 440B. For example, the second confidence threshold may be set at a low value such as 0.5 for a range of 0.5-0.8.

If the overall confidence value meets the range between the first and second confidence thresholds, then the process 400B continues by notifying the user that the overall confidence value met the range. This is illustrated at step 445B. For example, because the first confidence threshold was not met but the second confidence threshold was met, this may indicate that some of the copied data on the clipboard manager may not match the input fields of the paste environment or may not be able to be pasted in the original copied form. The process 400B continues by requesting the user to make a selection on whether to paste the matched data. This is illustrated at step 450B. Returning to process 400A, the user selects an appropriate action according to the confidence threshold determination. This is illustrated at step 420A.

Returning to process 400B, if the user selects to paste the matched data "Yes" at step 450B, the process 400B continues by pasting any matched data in the appropriate input fields based on its individual confidence value, while any data that does not match the input fields is pasted as plain text. This is illustrated at step 455B. In embodiments, copied data that does not match the input fields may be pasted as plain text into the selected area chosen by the user. In some embodiments, this may be the area where the user initiated the paste function, or it may be an area chosen by the user after notification that some copied data did not match the input fields of the paste environment. In embodiments, the individual confidence value may be compared to a set of individual confidence thresholds that are similar to the overall confidence thresholds.

If the user selects not to paste the matched data, "No" at step 450, then all of the copied data may be pasted as plain text regardless of the individual threshold being met. This is illustrated at step 460B. For example, because some of the copied data from the copied data environment may not be compatible with the paste environment, while some may be compatible that's on the clipboard manager, the user may decide to only paste all the data in plain text for formatting reasons.

Returning to step 440B, if the second confidence threshold is not met, "No" at step 440B, meaning that there is a low confidence that the copied data matches the input field in the paste environment, then the system will notify the user that the second confidence threshold was not met and indicate that there is a paste failure. This is illustrated at step 465B. In some embodiments, the system may request the user to make a selection on whether or not to paste the copied data as plain text or to terminate the paste function. For example, returning to process 400A, the user selects an appropriate action according to the confidence threshold determination. This is illustrated at step 420A. In some embodiments, the system may automatically paste all the copied data as plain text if the second threshold is not met. This is illustrated at step 470B. In this way, the user can evaluate the pasted content within the paste environment.

In embodiments, once the copied data on the clipboard manager is pasted (or terminated) in the paste environment, the process 400B is completed. Returning to process 400A, once the copied data has been pasted in the paste environment, new copied data will be appended to the clipboard manager. This is illustrated at step 425A. In embodiment, the system may maintain all copied data on the clipboard manager even after the copied data has been pasted and continue to append the clipboard manager with new copied data. In this way, the system may use all copied data and associated metadata to make contextual determinations on where to paste the copied data in the paste environment. The process 400A returns to step 405A.

In some embodiments, the clipboard manager may be cleared in response to the paste function being completed and initiation of a new copy function in one or more data environments. For example, once process 400B is completed, the clipboard manager will clear in response to process 400A returning to step 405A.

Figure 5:
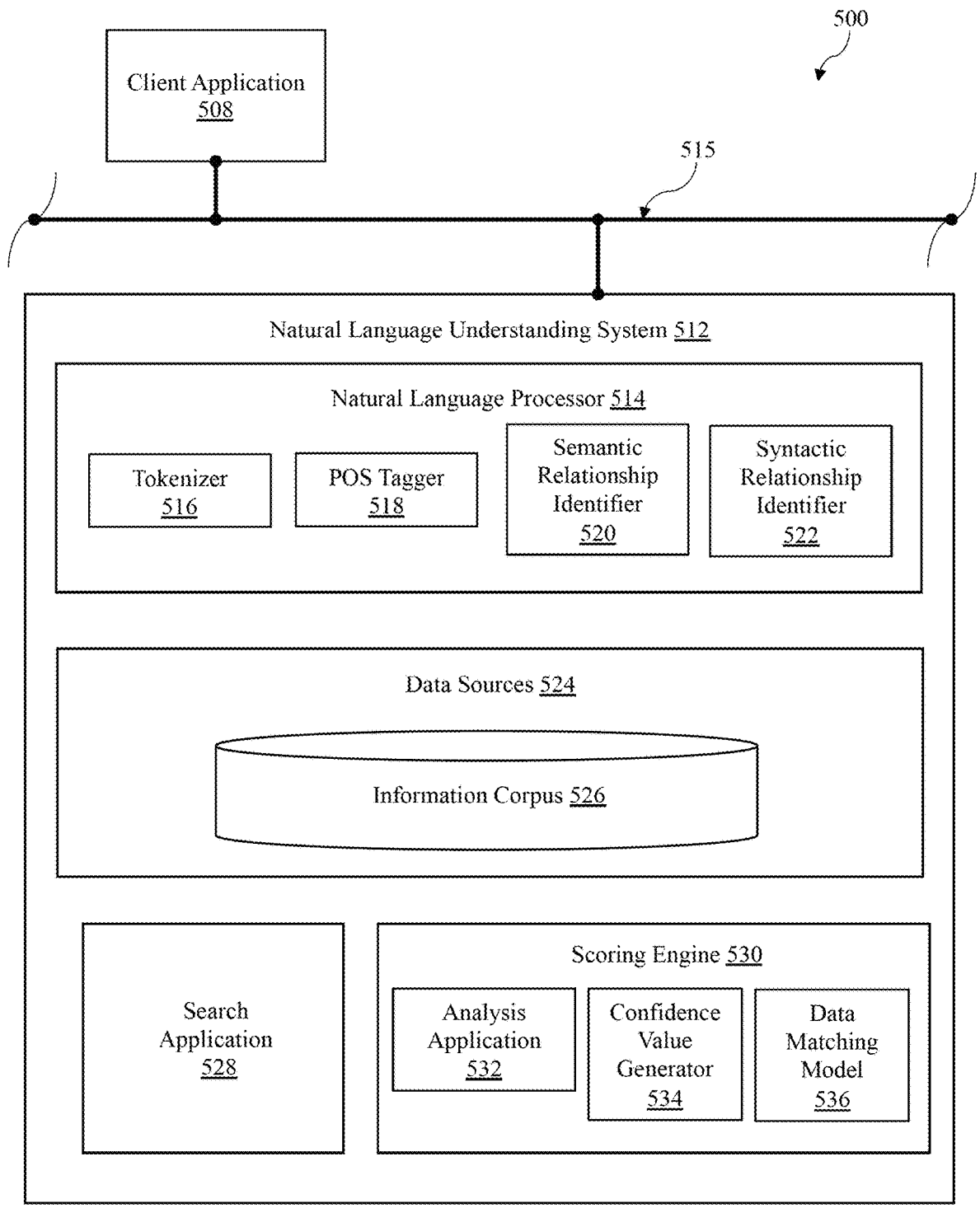
FIG. 5 illustrates a block diagram of an example natural language understanding system configured to analyze contextual information from copied data and each data environment, in accordance with some embodiments of the present disclosure.

Referring now to FIG. 5, shown is a block diagram of an exemplary system architecture 500, including a natural language understanding system 512, configured to analyze contextual information from copied data and each data environment, in accordance with some embodiments of the present disclosure. In some embodiments, copied data stored on the clipboard manager 116 and data 132 of paste environment 130 may be analyzed by the natural language understanding system 512 which may be housed on host device 102 of FIG. 1. Such a host device may include a client application 508, which may be used to initiate copying and pasting of the data over network 515.

Consistent with various embodiments, the natural language understanding system 512 may respond copy and paste functions initiated by the client application 508. Specifically, the natural language understanding system 512 may analyze copied data and or paste data to extract contextual information to identify matching contextual data and/or input fields. In some embodiments, the natural language understanding system 512 may include a natural language processor 514, data sources 524, a search application 528, and a scoring engine 530. The natural language processor 514 may be a computer module that analyzes the copied data, associated metadata, unstructured data related to both the copy data and paste environments to determine the context of the copy and pasted data. The natural language processor 514 may perform various methods and techniques for analyzing the contextual data (e.g., syntactic analysis, semantic analysis, etc.). The natural language processor 514 may be configured to recognize and analyze any number of natural languages. In some embodiments, the natural language processor 514 may parse textual content of the copied data and the associated metadata of the paste environment. Further, the natural language processor 514 may include various modules to perform analyses of textual data. These modules may include, but are not limited to, a tokenizer 516, a part-of-speech (POS) tagger 518, a semantic relationship identifier 520, and a syntactic relationship identifier 522.

In some embodiments, the tokenizer 516 may be a computer module that performs lexical analysis. The tokenizer 516 may convert a sequence of characters into a sequence of tokens. A token may be a string of characters included in an electronic document (text document, spreadsheet, webpage, etc.) and categorized as a meaningful symbol. Further, in some embodiments, the tokenizer 516 may identify word boundaries in an electronic document and break any text passages within the document into their component text elements, such as words, multiword tokens, numbers, and punctuation marks. In some embodiments, the tokenizer 516 may receive a string of characters, identify the lexemes in the string, and categorize them into tokens.

Consistent with various embodiments, the POS tagger 518 may be a computer module that marks up a word in passages to correspond to a particular part of speech. The POS tagger 518 may read a passage or other text in natural language and assign a part of speech to each word or other token. The POS tagger 518 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of one article on an entity may shed light on the meaning of text elements in another article on the same entity, particularly if they are part of the same corpus or universe). Examples of parts of speech that may be assigned to words include, but are not limited to, nouns, verbs, adjectives, adverbs, and the like. Examples of other part of speech categories that POS tagger 518 may assign include, but are not limited to, comparative or superlative adverbs, wh-adverbs, conjunctions, determiners, negative particles, possessive markers, prepositions, wh-pronouns, and the like. In some embodiments, the POS tagger 518 may tag or otherwise annotate tokens of a passage with part of speech categories. In some embodiments, the POS tagger 518 may tag tokens or words of a passage to be parsed by the natural language understanding system 512.

In some embodiments, the semantic relationship identifier 520 may be a computer module that may be configured to identify semantic relationships of recognized text elements (e.g., words, phrases) in electronic documents and/or text. In some embodiments, the semantic relationship identifier 520 may determine functional dependencies between entities and other semantic relationships.

Consistent with various embodiments, the syntactic relationship identifier 522 may be a computer module that may be configured to identify syntactic relationships in a passage composed of tokens. The syntactic relationship identifier 522 may determine the grammatical structure of sentences such as, for example, which groups of words are associated as phrases and which word is the subject or object of a verb. The syntactic relationship identifier 522 may conform to formal grammar.

In some embodiments, the natural language processor 514 may be a computer module that may parse copied data of an electronic document with respect to input fields of a paste environment and generate matching data structures.

In some embodiments, the output of the natural language processor 514 may be stored as an information corpus 526 in one or more data sources 524. In some embodiments, data sources 524 may include data warehouses, information corpora, data models, and document repositories. The information corpus 526 may enable data storage and retrieval. In some embodiments, the information corpus 526 may be a storage mechanism that houses a standardized, consistent, clean, and integrated copy of the ingested and parsed electronic documents used to generate confidence values between the copied data and the input fields of the paste environment. Data stored in the information corpus 526 may be structured in a way to specifically address analytic requirements. In some embodiments, the information corpus 526 may be a relational database.

In some embodiments, the natural language understanding system 512 may include a scoring engine 530. The scoring engine 530 may be a computer module that is configured to calculate one or more confidence values related to the copied data and the pasted data environment. In some embodiments, the scoring engine 530 may contain submodules. For example, the scoring engine 530 may contain an analysis application 532, confidence value generator 534, and a data matching model 536. The analysis application 532 may be configured to parse an electronic document using the natural language processor 514 and related subcomponents 516-522. The analysis application 532 may make determinations one whether the copied data matches the input fields of the paste data environment. The confidence value generator 534 may generate a confidence score for each copied data with respect to a given matching input field in the paste data environment. The data matching model 536 is configured to align each copied data with each input field of a plurality of input fields in the paste environment based on the confidence score. In this way, upon paste, the copied data is pasted to the correct input field based on a contextual analysis.

Figure 6:
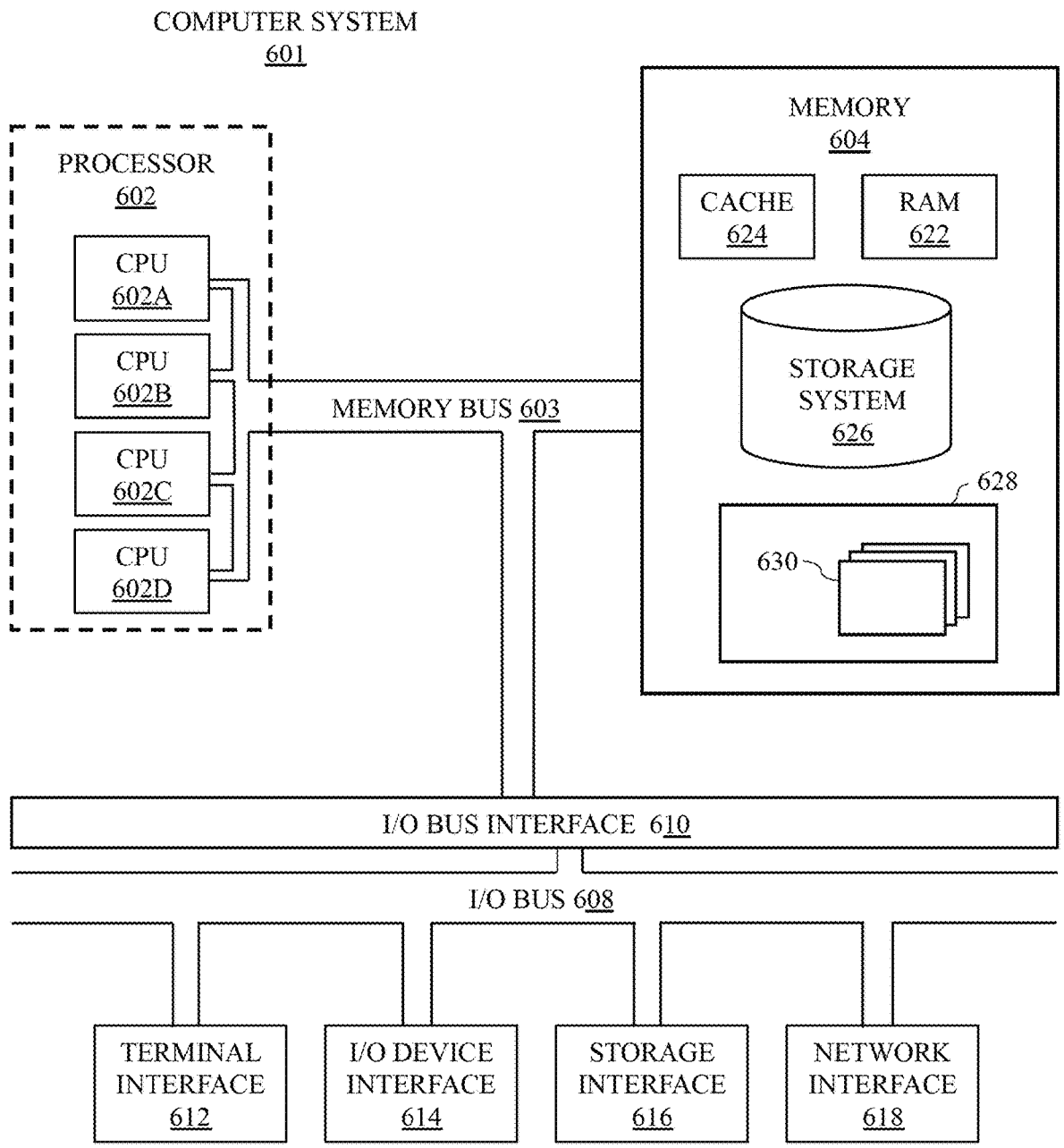
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache. In some embodiments, a processor can include at least one or more of, a memory controller, and/or storage controller. In some embodiments, the CPU can execute the processes included herein (e.g., processes 400A and 400B as described in FIG. 4A and FIG. 4B, respectively). In some embodiments, the computer system 601 may be configured as multi-location copying and pasting system 100 of FIG. 1.

System memory subsystem 604 may include computer system readable media in the form of volatile memory, such as random-access memory (RAM) 622 or cache memory 624. Computer system 601 may further include other removable/non-removable, volatile/non-volatile computer system data storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 604 can include flash memory, e.g., a flash memory stick drive or a flash drive. Memory devices can be connected to memory bus 603 by one or more data media interfaces. The memory subsystem 604 may include at least one program product having a set (e.g., at least one) of program modules that are configured to carry out the functions of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single units, the computer system 601 may, in some embodiments, contain multiple I/O bus interfaces 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory subsystem 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 628 and/or program modules 630 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various search servers through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
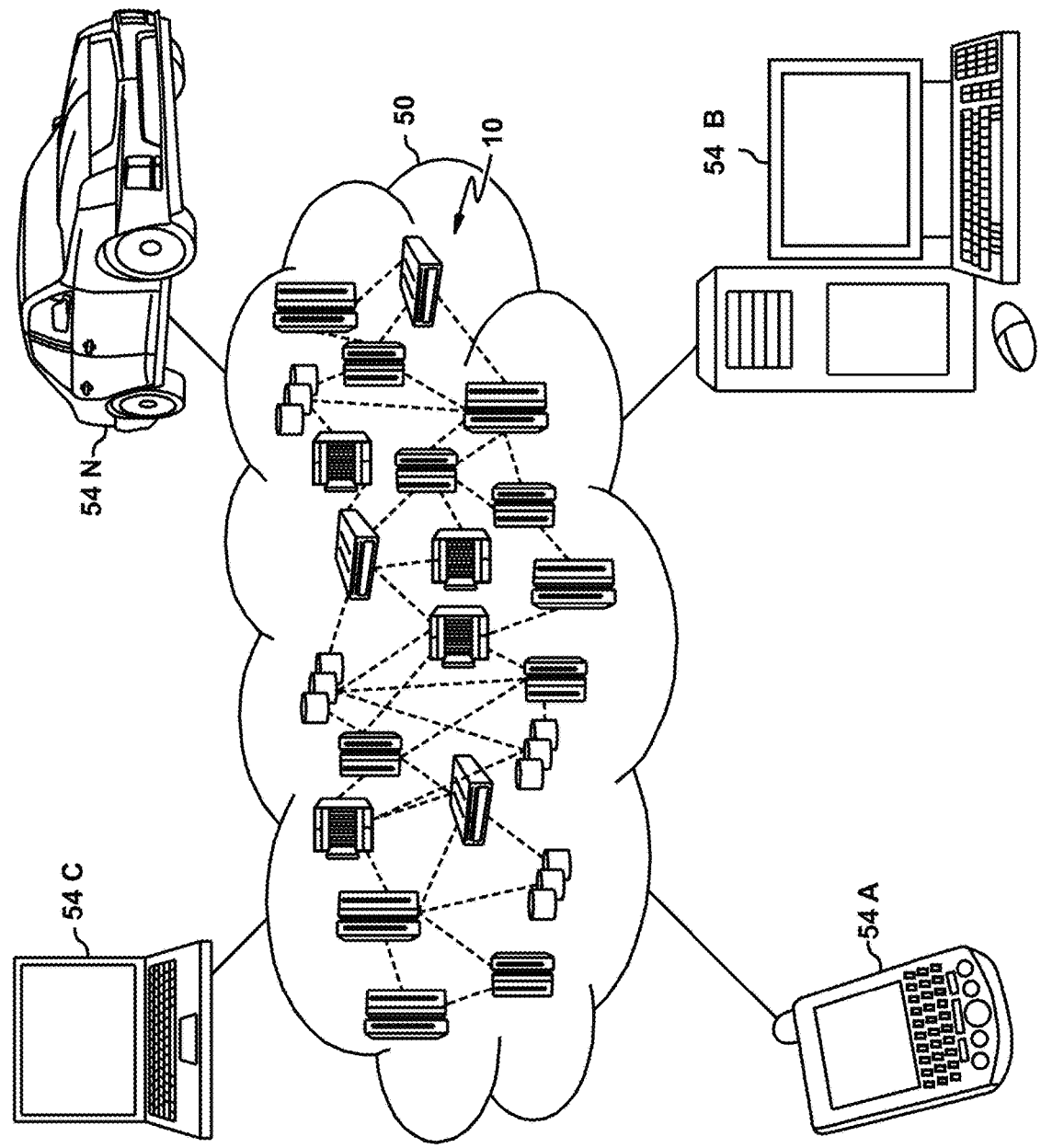
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
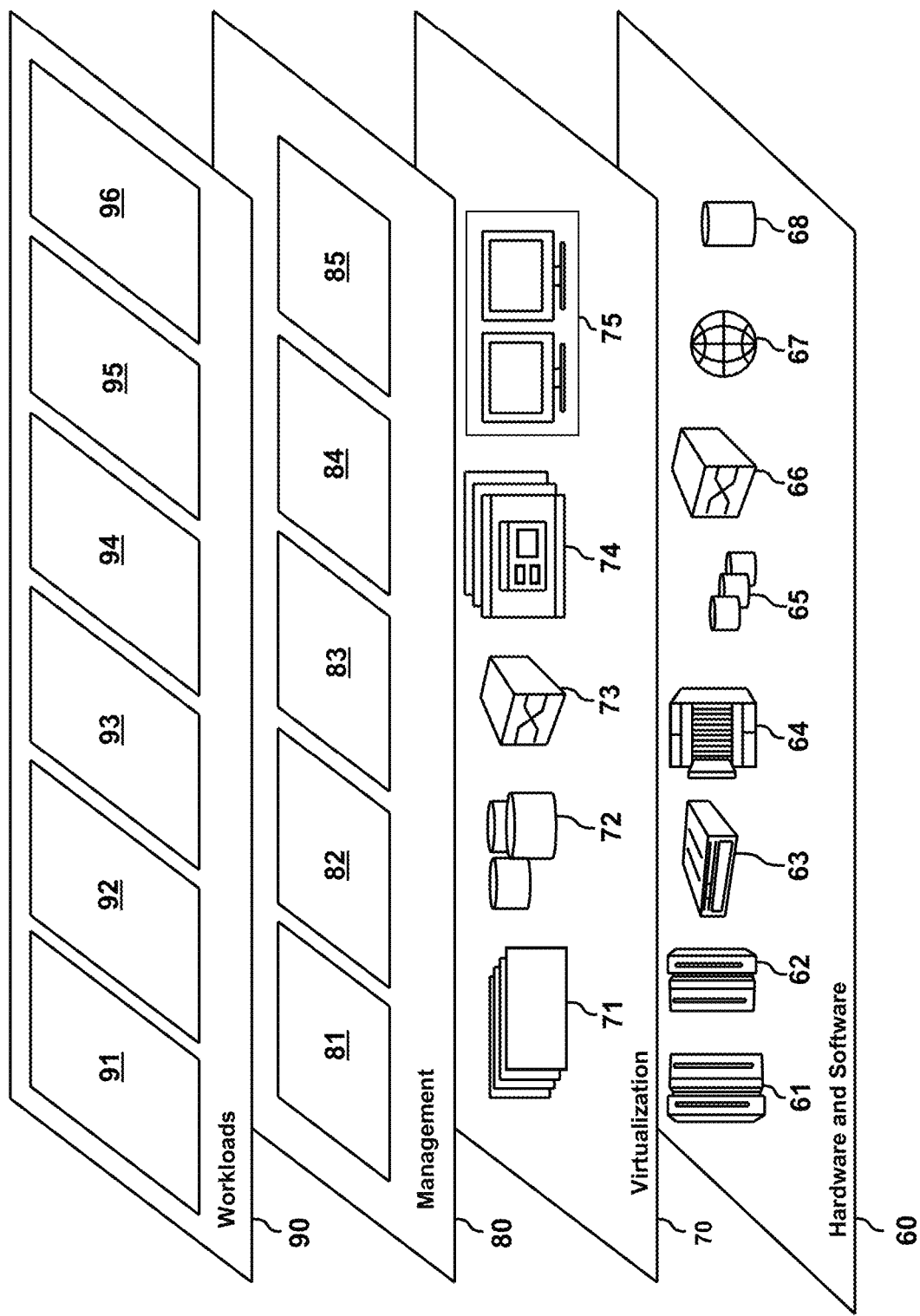
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and copy and pasting management software 68 in relation to the multi-location copying and pasting system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and copying and pasting management and processing 96. For example, multi-location copying and pasting system 100 of FIG. 1 may be configured to manage copying and pasting using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   collecting a plurality of copied data elements from a plurality of different software applications into a clipboard manager, wherein metadata associated with the plurality of copied data elements is also saved to the clipboard manager;
   comparing, in response to a paste function being initialized into one or more input fields of a plurality of input fields of a first software application, the plurality of copied data elements and associated metadata with contextual data associated with the plurality of input fields;
   calculating, based on the comparing, a software application confidence value and an individual confidence value for each copied data element of the plurality of copied data elements, wherein the software application confidence value comprises an application compatibility score and wherein the individual confidence value for each copied data element is based on a level of matching the contextual data associated with each input field of the plurality of input fields;
   generating, based on the calculating, an overall confidence value for the plurality of copied data elements;
   comparing the overall confidence value of the plurality of copied data elements to a set of confidence thresholds associated with completing the paste function; and
   pasting, automatically and in response to the overall confidence value meeting a first confidence threshold, each copied data element of the plurality of copied data elements into a most closely matching input field of the plurality of input fields of the first software application based, in part, on the individual confidence value.

2. The computer-implemented method of claim 1, further comprising:
  notifying, in response to the overall confidence value meeting a range between a first confidence threshold and a second confidence threshold, a user that the overall confidence value met the range;
  comparing the individual confidence value of each copied data element of the plurality of copied data elements to an individual confidence threshold for matching each input field of the plurality of input fields;
  identifying one or more copied data elements that have individual confidence values that fail to meet the individual confidence threshold;
  requesting, in response to the identifying, that the user make selection on how to complete the paste function for the plurality of copied data elements,
  receiving a selection from the user; and
  pasting each copied data element of the plurality of data into the matching input field of the plurality of input fields according to the selection.

3. The computer-implemented method of claim 2, wherein the selection is chosen from the group of selections consisting of:
  pasting the one or more copied data elements that have individual confidence values that fail to meet the individual confidence threshold as plain text and pasting any remaining copied data elements from the plurality of copied data elements that meet the individual confidence threshold in their original copied form;
  pasting all of the plurality of copied data elements as plain text regardless of the individual threshold being met; and
  terminating completion of the paste function.

4. The computer-implemented method of claim 1, further comprising:
  notifying, in response to the overall confidence value failing to meet a range between a first threshold and a second confidence threshold, a user that the overall confidence value failed to meet the range;
  requesting that the user make a selection on how to complete the paste function for the plurality of copied data elements, wherein the selection is chosen from the group of selections consisting of:
  pasting all of the plurality of copied data elements as plain text; and
  terminating the paste function.

5. The computer-implemented method of claim 1, wherein the contextual data associated with the plurality of input fields comprises metadata and unstructured data.

6. The computer-implemented method of claim 5, wherein comparing the plurality of copied data elements and the associated metadata with the contextual data associated with the plurality of input fields is performed, in part, using natural language understanding.

7. The computer-implemented method of claim 1, further comprising:
  resetting, in response to completing the paste function and initiating a new copy function, the clipboard manager.

8. The computer-implemented method of claim 1, wherein at least one of the different software applications of the plurality of different software applications is an integrated development environment (IDE) and the the first software application is an electronic spreadsheet.

9. The computer-implemented method of claim 1, further comprising:
  analyzing, using machine learning, historical data related to manual changes to pasted data elements implemented by a user in response to the paste function being completed;
  determining, based on the analyzing and using machine learning, that the first confidence threshold was set incorrectly; and
  adjusting automatically, based on the determining and using machine learning, the first confidence threshold.

10. The computer-implemented method of claim 1, further comprising:
  analyzing, using machine learning, historical data related to manual changes to pasted data elements implemented by a user in response to the paste function being completed; and
  modifying, based on the analyzing and using machine learning, algorithms for comparing the copied data elements with contextual data from the plurality of input fields.

11. A system comprising:
  a processor; and
  a computer-readable storage medium communicatively coupled to the processor and storing program instructions which, when executed by the processor, cause the processor to perform a method comprising:
    collecting a plurality of copied data elements from a plurality of different software applications into a clipboard manager, wherein metadata associated with the plurality of copied data elements is also saved to the clipboard manager;
    comparing, in response to a paste function being initialized into one or more input fields of a plurality of input fields of a first software application, the plurality of copied data elements and associated metadata with contextual data associated with the plurality of input fields;
    calculating, based on the comparing, a software application confidence value and an individual confidence value for each copied data element of the plurality of copied data elements, wherein the software application confidence value comprises an application compatibility score and wherein the individual confidence value for each copied data element is based on a level of matching the contextual data associated with each input field of the plurality of input fields;
    generating, based on the calculating, an overall confidence value for the plurality of copied data elements;
    comparing the overall confidence value of the plurality of copied data elements to a set of confidence thresholds associated with completing the paste function; and
    pasting, automatically and in response to the overall confidence value meeting a first confidence threshold, each copied data element of the plurality of copied data elements into a most closely matching input field of the plurality of input fields of the first software application based, in part, on the individual confidence value.

12. The system of claim 11, wherein the method performed by the processor further comprises:
  notifying, in response to the overall confidence value meeting a range between a first confidence threshold and a second confidence threshold, a user that the overall confidence value met the range;
  comparing the individual confidence value of each copied data element of the plurality of copied data elements to an individual confidence threshold for matching each input field of the plurality of input fields;

identifying one or more copied data elements that have individual confidence values that fail to meet the individual confidence threshold;

requesting, in response to the identifying, that the user make selection on how to complete the paste function for the plurality of copied data elements;

receiving a selection from the user; and pasting each copied data element of the plurality of data into the matching input field of the plurality of input fields according to the selection.

13. The system of claim 12, wherein the selection is chosen from the group of selections consisting of:

pasting the one or more copied data elements that have individual confidence values that fail to meet the individual confidence threshold as plain text and pasting any remaining copied data elements from the plurality of copied data elements that meet the individual confidence threshold in their original copied form;

pasting all of the plurality of copied data elements as plain text regardless of the individual threshold being met; and terminating completion of the paste function.

14. A computer program product comprising a computer-readable storage medium having program instructions embodied therewith, the program instructions executable by a processor to cause the processor to perform a method comprising:

collecting a plurality of copied data elements from a plurality of different software applications into a clipboard manager, wherein metadata associated with the plurality of copied data elements is also saved to the clipboard manager;

comparing, in response to a paste function being initialized into one or more input fields of a plurality of input fields of a first software application, the plurality of copied data elements and associated metadata with contextual data associated with the plurality of input fields;

calculating, based on the comparing, a software application confidence value and an individual confidence value for each copied data element of the plurality of copied data elements, wherein the software application confidence value comprises an application compatibility score and wherein the individual confidence value for each copied data element is based on a level of matching the contextual data associated with each input field of the plurality of input fields;

generating, based on the calculating, an overall confidence value for the plurality of copied data elements;

comparing the overall confidence value of the plurality of copied data elements to a set of confidence thresholds associated with completing the paste function; and pasting, automatically and in response to the overall confidence value meeting a first confidence threshold, each copied data element of the plurality of copied data elements into a most closely matching input field of the plurality of input fields of the first software application based, in part, on the individual confidence value.

15. The computer program product of claim 14, wherein the method performed by the processor further comprises:

notifying, in response to the overall confidence value meeting a range between a first confidence threshold and a second confidence threshold, a user that the overall confidence value met the range;

comparing the individual confidence value of each copied data element of the plurality of copied data elements to an individual confidence threshold for matching each input field of the plurality of input fields;

identifying one or more copied data elements that have individual confidence values that fail to meet the individual confidence threshold;

requesting, in response to the identifying, that the user make selection on how to complete the paste function for the plurality of copied data elements;

receiving a selection from the user; and pasting each copied data element of the plurality of data into the matching input field of the plurality of input fields according to the selection.

* * * * *